United States Patent
Nimon et al.

(10) Patent No.: US 8,448,073 B2
(45) Date of Patent: May 21, 2013

(54) MULTIPLE CAMERA GROUP COLLABORATION SYSTEM AND METHOD

(75) Inventors: Robert E. Nimon, Dallas, TX (US); Gregory L. Mayhan, Richardson, TX (US); Charles Eric Langford, Dallas, TX (US); Samuel R. Langford, Dallas, TX (US)

(73) Assignee: Viewplicity, LLC, Dallas, TX (US)

( * ) Notice: Subject to any disclaimer, the term of this patent is extended or adjusted under 35 U.S.C. 154(b) by 76 days.

(21) Appl. No.: 12/878,905

(22) Filed: Sep. 9, 2010

(65) Prior Publication Data
US 2011/0109717 A1 May 12, 2011

Related U.S. Application Data

(60) Provisional application No. 61/240,915, filed on Sep. 9, 2009.

(51) Int. Cl.
*G06F 3/00* (2006.01)
*H04N 7/14* (2006.01)

(52) U.S. Cl.
USPC ........................................ 715/753; 348/14.08

(58) Field of Classification Search
USPC ............... 715/753, 756, 759, 751; 348/14.08, 348/14.09
See application file for complete search history.

(56) References Cited

U.S. PATENT DOCUMENTS

| | | | |
|---|---|---|---|
| 6,959,322 B2 | 10/2005 | Ludwig et al. | |
| 7,362,349 B2 * | 4/2008 | Nelson et al. | 348/14.08 |
| 7,565,614 B2 * | 7/2009 | Hamano | 715/753 |
| 7,634,533 B2 | 12/2009 | Rudolph et al. | |
| 7,984,098 B2 * | 7/2011 | Enete et al. | 709/204 |
| 2005/0262201 A1 | 11/2005 | Rudolph et al. | |
| 2006/0031290 A1 * | 2/2006 | Mannaru et al. | 709/204 |
| 2006/0236247 A1 * | 10/2006 | Morita et al. | 715/733 |
| 2007/0285501 A1 * | 12/2007 | Yim | 348/14.08 |
| 2008/0016156 A1 * | 1/2008 | Miceli et al. | 709/204 |
| 2008/0019388 A1 * | 1/2008 | Harmon et al. | 370/412 |
| 2008/0084927 A1 * | 4/2008 | Rosenzweig et al. | 375/240.02 |
| 2008/0098295 A1 * | 4/2008 | Nelson et al. | 715/233 |
| 2008/0235362 A1 * | 9/2008 | Kjesbu et al. | 709/223 |
| 2009/0037826 A1 * | 2/2009 | Bennetts | 715/753 |
| 2009/0089683 A1 * | 4/2009 | Thapa | 715/756 |
| 2010/0037151 A1 | 2/2010 | Ackerman et al. | |

* cited by examiner

*Primary Examiner* — Rashawn Tillery
(74) *Attorney, Agent, or Firm* — David W. Carstens; Kevin M. Klughart; Carstens & Cahoon, LLP

(57) ABSTRACT

An improved group collaboration system providing control and management of multiple cameras for multiple users (members). The system includes a server for system management and a server for video data. Multiple clients, each having multiple cameras, may access the system simultaneously. Each client has a browser interface that allows a user to access multiple member cameras. Each selected camera is displayed simultaneously in the selecting user's interface. A bandwidth distribution algorithm provides quality of service for the multiple camera feeds.

12 Claims, 6 Drawing Sheets

MULTIPLE CAMERA GROUP COLLABORATION SYSTEM AND METHOD

CROSS-REFERENCE TO RELATED APPLICATIONS

This application claims the benefit of provisional Application No. 61/240,915, which was filed on Sep. 9, 2009.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to computer supported group collaboration systems, and more particularly to a system for organizing users into temporary or persistent groups to allow them to communicate through live or recorded video, audio, or text broadcasts to other members of the group.

2. Description of Related Art Including Information Disclosed Under 37 CFR 1.97 and 1.98

The formation of collaboration groups is motivated by the natural tendency for people to work together in small groups (church small groups, scouting groups, work projects, etc.). These groups tend to be persistent over some short period of time (weeks, months, years). The products in this field that provide for these groups offer little to no support for users that require multiple cameras from a single workstation. The management of groups of users that require this type of support along with the features that they need to adequately control their communication is missing from this product base.

Present systems for group collaboration are limited in functionality and do not provide the necessary capabilities for effective and efficient collaboration. What is needed is a system that supports virtually any number of cameras and microphones and that manages the bandwidth requirements for each to ensure adequate quality of service from each. Further, what is needed is the ability to support the use of both live and recorded video in a collaboration session to provide options for the conveyance of information among the group. Further, what is needed is an appropriate interface to organize and efficiently present these multiple sources of information to the members of the group. The present invention addresses these needs and others as described in the following detailed disclosure.

BRIEF SUMMARY OF THE INVENTION

An improved group collaboration system providing control and management of multiple cameras for multiple users (members). The system includes a server for system management and a server for video data. Multiple clients, each having multiple cameras, may access the system simultaneously. Each client has a browser interface that allows a user to access multiple member cameras. Each selected camera is displayed simultaneously in the selecting user's interface. A bandwidth distribution algorithm provides quality of service for the multiple camera feeds.

These and other improvements will become apparent when the following detailed disclosure is read in light of the supplied drawings. This summary is not intended to limit the scope of the invention to any particular described embodiment or feature. It is merely intended to briefly describe some of the key features to allow a reader to quickly ascertain the subject matter of this disclosure. The scope of the invention is defined solely by the claims when read in light of the detailed disclosure.

BRIEF DESCRIPTION OF THE SEVERAL VIEWS OF THE DRAWING(S)

The present invention will be more fully understood by reference to the following detailed description of the preferred embodiments of the present invention when read in conjunction with the accompanying drawings, in which like reference numbers refer to like parts throughout the views, wherein.

Figure 1:
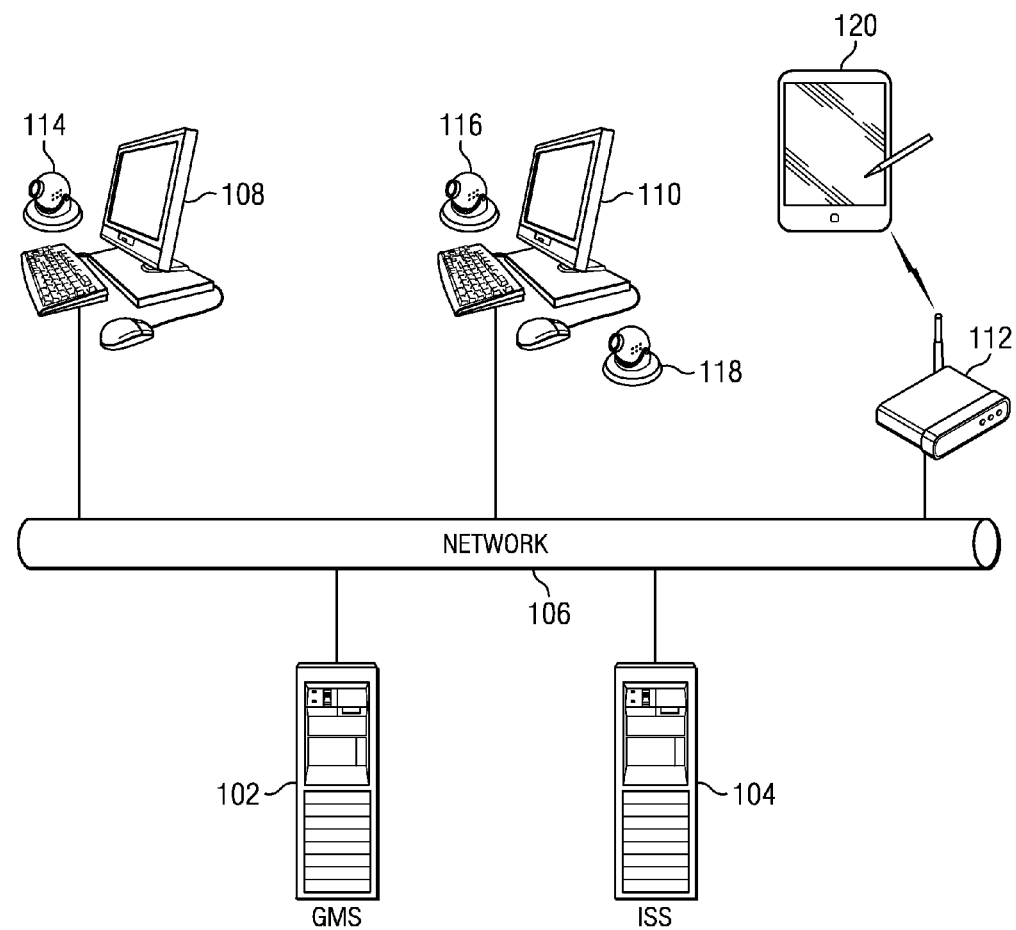
FIG. 1 depicts an embodiment of the system of the present invention.

Where used in the various figures of the drawing, the same reference numbers designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

DETAILED DESCRIPTION OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The disclosed embodiment of the present invention operates over a networked computer system that allows for user interaction via a remote networked computer. This computer network may comprise one or a combination of PAN, LAN, CAN, WAN, MAN, GAN, VPN, Internet, or any suitable wired or wireless network that allows for exchange of packetized data between computers. Further, the method of communication between the networked computers of the present embodiment is the TCP/IP communication protocol, but may be any such protocol that allows the exchange of packetized data between systems.

FIG. 1 of the drawings depicts a first embodiment of the system of the present invention. As shown, one or more Group Management Servers (102) and one or more Interaction Support Servers (104) are connected to a computer network (106). Client systems (108 and 110) communicate with the Group Management Servers and Interaction Support Servers over this same network (106). Access may also be had by tablet PCs (112) (for example, the iPad device) via a wireless access point or cellular communication connection (112). Each client (108, 110, and 112) utilizes one or more cameras (114, 116, 118, and 120) that transmit video data to the ISS (104). It is possible for a single client to provide multiple cameras. For example, depicted is one client (110) with two cameras (116 and 118), each offering a separate video image.

In the present embodiment, user interaction with the novel invention discussed herein occurs through a browser window (such as Microsoft Internet Explorer, Mozilla Firefox, Apple Safari, Google Chrome, Opera, or the like) operating on the user's networked computer system. The computer system may consist of a dedicated server, workstation, personal computer, laptop, notebook, PDA, smart phone, or the like, upon which such browser is operable. Such browser allows the user to view HTML documents exchanged on the network. The User Interface (UI) of the present invention is displayed before the user within this browser window and accepts user interaction through various scripts and hyperlinks.

Figure 2:
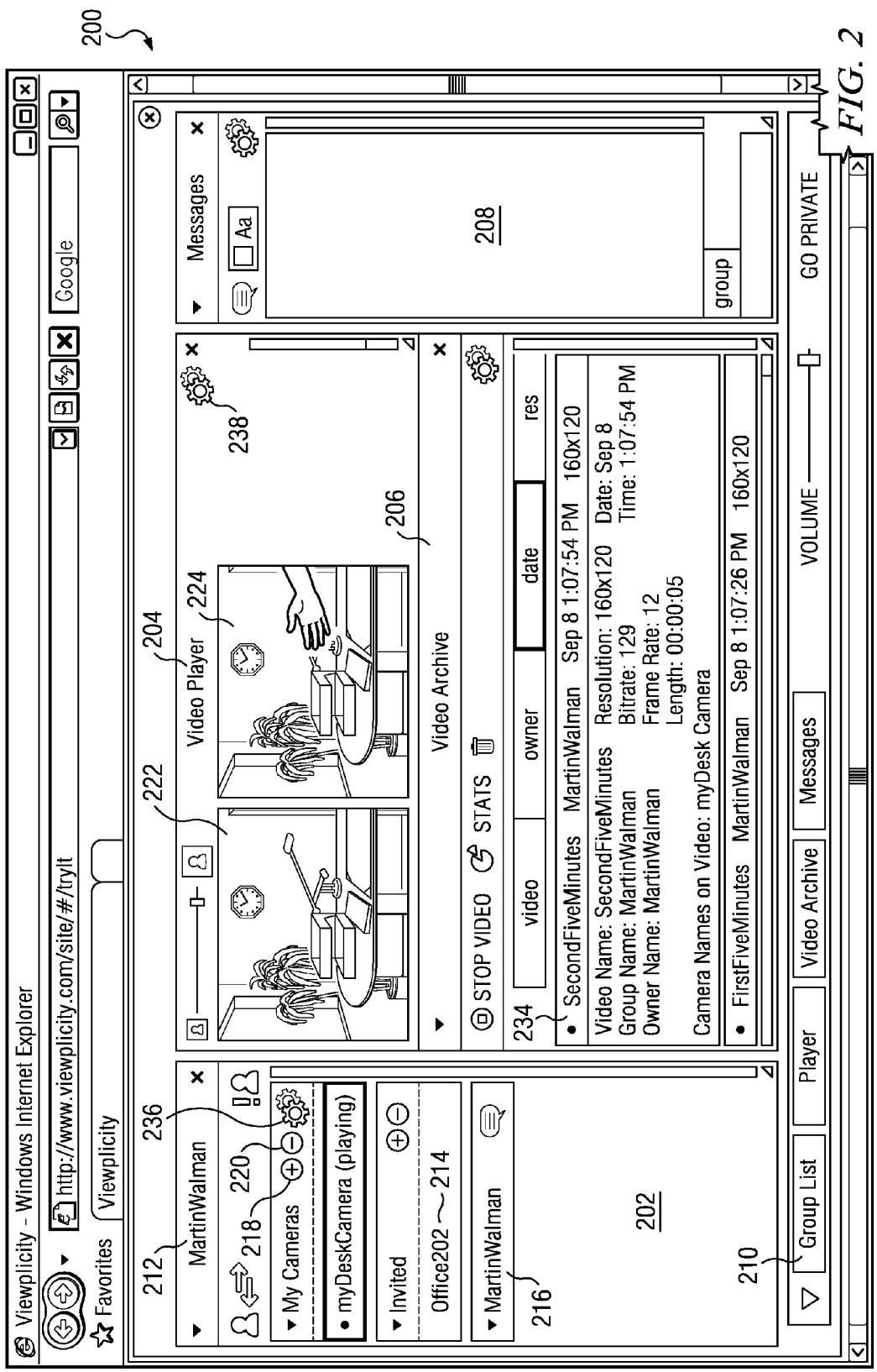
FIG. 2 depicts an embodiment of the User Interface as seen by a user of the present invention.

FIG. 2 of the drawings depicts a first embodiment of the UI (200). In accordance with this embodiment of the invention, each authenticated client user of the present invention will be provided with a UI view of some combination of components from a set of components: Group Component (202), a Player Component (204), a Video Archive Component (206), a Message Component (208), and a Toolbar Component (210). The aggregate of these components comprise the client workstation support for participation in a collaboration group, augmented by one or more Group Management Servers (GMS) and one or more Interaction Support Servers (ISS). These servers (GMS and ISS) are operable as independent computer servers upon which software code operable to provide the functionality disclosed herein is executed. However, one of ordinary skill will appreciate that multiple instances of the GMS and ISS may operate upon a single server hardware unit, or may operate on dedicated independent server hardware depending upon the load requirements of the overall system.

In the preferred embodiment, the GMS software uses the basic LAMP stack (Linux, Apache, MySql, PHP), while the ISS uses one of the common Flash interaction servers (i.e., Adobe FMIS, open source RED5, WOWZA, or the like). In this embodiment, the client workstation components are browser based software (i.e., Internet Explorer, Firefox, or the like) implemented with some combination of HTML, CSS, JavaScript, or Flash ActionScript. While specific programming languages are provided, one of ordinary skill will appreciate that other languages may be utilized and are within the scope of the claims.

Each component in the preferred embodiment consists of a User Interaction View comprised of a combination of HTML/CSS and JavaScript code. These views are supported by a set of GMS interface comprised of JavaScript and a Flash ActionScript encapsulated in a Flash object. The set consists of a Group Interaction Manager (GM), an Archive Manager (AM), zero, one or more Camera Self View Managers (SV), and zero, one or more camera Remote View Managers (RV).

In the present embodiment, each user client workstation initiates interaction with the GM logging into the GMS, establishing a username (212) for the session, and a group (by name) for entry. The GM also receives a list of all other current members in that group and their current status, which is communicated to the Group Component View and displayed to the user. The Group Component displays lists of current members in the group organized by their offline, online, or invited status (214). The Group Component offers UI features to invite other website users into membership in the group and to allow the user to see what invitations that he has that are outstanding. A user may accept or decline such invitations.

The present embodiment lists the members in the group such that it is clear to the client user which of the members are merely online and which are broadcasting from one or more cameras (214, 216). The online member list consists of all members that are currently responding to the GMS. Some of these members may be shown with one or more cameras whose transmission(s) have been made publically viewable by the associated user (i.e., owner of the cameras). The list entry associated with a camera responds to a user double click in the UI by causing the remote view of the camera to be displayed via the Player Component (204).

The Group Component (202) offers a UI means, such as a "button" or hyperlink to executable code, to "add a camera" (218). If the user selects this option, he will be allowed to provide a logical name for the camera (i.e., "front door", "back door", "side view," etc.). It is this logical name that is displayed in the Group Component online list entry associated with the user. This logical name is what all of the other group members may select to watch the remote view of that camera. Similarly, the preferred embodiment Group Component offers a similar means to "delete a camera" (220). The Group Component uses these means to maintain a "My Cameras" list for the user of all of his active cameras in the UI (216).

When a camera is added to the list, the Player Component (204) is notified to produce a Self View for the camera (222). The Group Component list responds to a double click of a camera entry in "My Cameras" by toggling the state associated with this Self View. If the view is displayed, it will be removed and vice versa. The Group Component list entries for the remote members' cameras responds similarly to a selection event such that the corresponding display of the remote camera views are toggled onto and off of the Player's display panel with each user action.

Figure 2A:
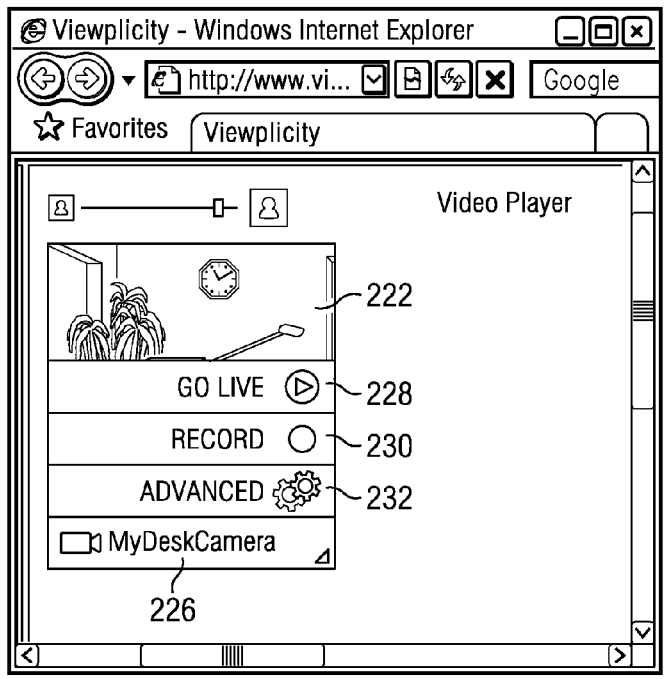
FIG. 2A is a more detailed view of the Video Player Component of the present embodiment.

The Player Component (204) is used to display three types of camera views: self views (222) for the local, connected cameras, remote views for the broadcasting cameras of other members, and recorded views (224) for videos that have been placed in the Video Archive. Each of these views accommodate the complexity of users having multiple cameras by displaying in an information bar associated with the view the name of the camera along with the name of the user. Thus, in an active group collaboration session, any number of users may simultaneously use the same name without confusion since all streams associated with those cameras are tagged with both the name of the member and the name of the camera (for example, "fred myDeskCamera"). This includes the recorded video displays as well. Each of the camera views in the Player Component view panel (204) respond to user interactions to close the view. The self views, as depicted in further detail in FIG. 2A, uniquely respond to user interactions to "go public" (228), "record" (230), "go private", "stop recording", and "advanced" (232) options to bring up a camera configuration UI means.

In the present embodiment the action of the "go public" (228) option associated with a given camera is responsible for making it viewable by other members of the group and for making it recordable. In yet another embodiment, cameras that are "private" may be recorded (230), with the resultant recording itself not viewable by the membership of the group until a subsequent user interaction makes the recording available to others.

Associated with each view displayed in the Player Component (204) is an instance of the SV (for self view) or RV (for remote view) Flash object in the preferred embodiment. The Group Component is associated with a single Group Manager (GM) Flash component. The GM is the primary interface between the user workstation client and the GMS, while the RV and SV objects are the primary interface between the workstation client and the ISS. The member state information is maintained on the GMS, while the video/audio streams are transmitted and received via the ISS. The video/audio recordings are made directly onto the ISS such that they are immediately available after the recording is complete.

It is known in the current state of the art that Flash objects similar to SV connect to a server similar to the ISS with a name associated with a stream from a local camera, which is generally associated with a username. Thus, objects similar to RV have been constructed to be able to play the resultant live stream. The present invention combines the username with a logical camera name such that RV can be directed to play any of a set of cameras broadcast from the user list by this combination. Recordings can similarly be made using the combination of these names, plus a name for the recording topic.

Referring again to FIG. 2, the Video Archive Component (206) is paired with the AM Flash object in the preferred embodiment. This object works with the ISS to keep track of recorded videos in the video archive associated with the user's active group. This component provides a UI view of the archive list, including, for each recording, a topic name, the username of the member that recorded it, the date/time the video was recorded, along with the logical camera name assigned to the camera that produced the video stream that was recorded (234). The topic name is used in this embodiment to allow recordings to be logically grouped. This logical grouping allows, for example, all videos that were recorded under a given topic name to be played "together", where together implies if the recordings were made serially (i.e., "weekly one hour recordings made by the president") to be played with one click such that the all play back serially while supporting the capability for each individual recording to be selected and played individually.

Likewise, in another embodiment, the recordings that were synchronously made (live streams broadcast at the same time) may be played back synchronously (subsequent playback of the "topic" of these streams results in multiple camera view simultaneously displayed in the Player Component (204) by a single click to play in the Video Archive Component (206) recording list. The Video Archive (206) component in this embodiment also provides user interaction means for deleting (erasing) recordings in the archive. In this embodiment, new recordings stored in the archive and the actions of deleting videos from the archive result in near immediate state change reflections in the Video Archive Manager views of all members currently logged into the effected group.

In the present embodiment, the Group Component (202) and the Player Component (204) allow the user to manage the configurations of his cameras. In the Group Component, the user can select a camera and then select the "advanced" icon to activate a user interaction function that supports changing camera and microphone settings (236). The Player Component has a similar icon (238) that can be selected to open a popup dialog with the user that works in the same manner on the current camera that is selected in the Group Manager view.

The user may also manage details associated with the selected camera. These details include the logical name for the camera (which is then subsequently used for tagging live streams and recordings associated with that camera), the physical camera that is to be used from the set of cameras currently available on the users workstation, the quality vs. speed tradeoffs should be made in managing the bandwidth associated with streams produced from this camera, the microphone that is to be used in association with this camera, and the audio gain level for this selected microphone. This user interaction also offers a "return to factory settings" option to restore all settings back to default. In another embodiment of the present invention, all such settings are persisted such that when the website is revisited (i.e., after the web browser has been closed and reopened) this logical camera will return to a state where its previous association with the previously specified physical camera along with its quality settings, microphone association, and microphone settings will all be restored. In yet another embodiment, all cameras and their logical associations are persistent and restored including the restoration required to return them to the previous display state in the Player Component and along with their public and private broadcast state.

In the present embodiment, the GM ISS interaction can be used to send broadcast system messages to all members of the group, as well as to specific functions within the GMS and ISS servers. One such use of the message broadcasts is to provide the state information related to the members to support the real time presence awareness of camera broadcast status. Another such use of these system broadcasts messages are in support of the functions provided by the Message Component (208). This component uses the GM system message function to broadcast group text messages and to send private inter member messages.

Figure 2B:
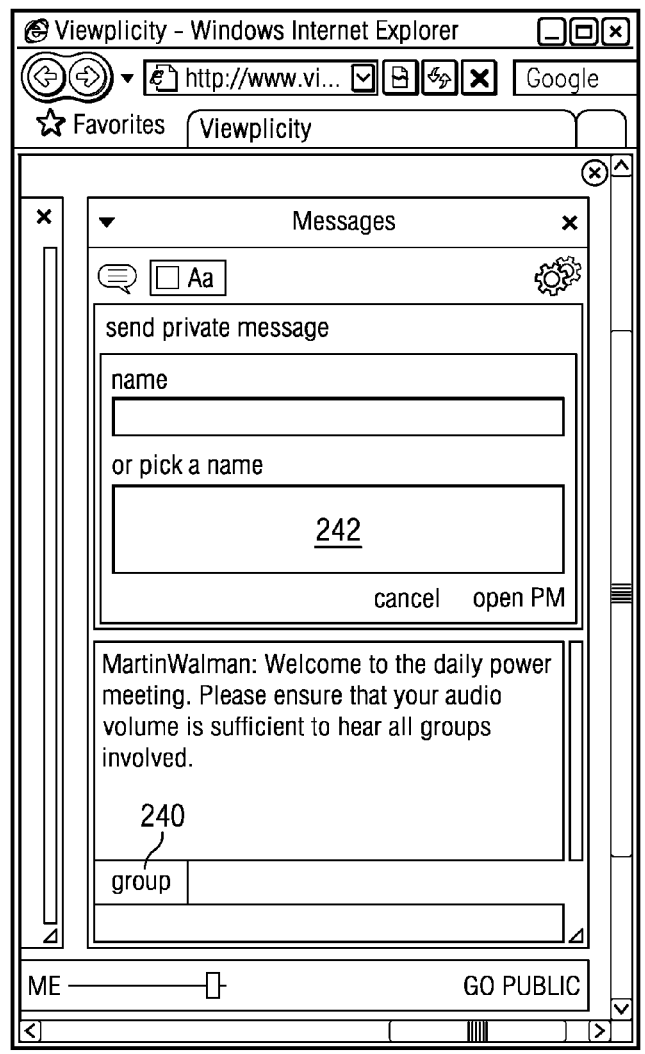
FIG. 2B is a more detailed view of the Messages Component of the present embodiment.

FIG. 2B displays the group message component in further detail. The group messages are displayed in association with a tab called "Group" in the text message display (240). The private member messages are displayed in a tab tagged with the username of the sender of the message as the message is displayed in the receiver (242). The Message Component not only displays messages, but also adds the support of saving and tagging the text messages with the information required to be able to link to video recordings that were being made synchronously with broadcast of the message, facilitating synchronized playback of the messages with the playback of the associated videos. This playback includes, when available, multiple camera video from multiple group members and text chat contributions from each of the members.

In this embodiment, the bandwidth usage of the clients interacting with ISS to send/receive video/audio streams is automatically managed such that all cameras receive a fair allocation of the available bandwidth. This ensures that the available bandwidth is not saturated to such a degree that the quality of all of the video suffers, and such that the bandwidth usage is kept far enough below the saturation point that audio will not be subject to momentary interruptions typical of bandwidth utilization problems (users tend to be more sensitive to interruptions in audio than they do video). These problems are more difficult to prevent in situations requiring multiple simultaneous cameras, therefore the present embodiment of this invention provides a mean for Adaptive Bandwidth Allocation (ABA).

The ABA method detects the users upward network bandwidth and reserves a certain percentage of it for interaction with the ISS (i.e., 40%) to be used to allocate among the cameras that are under control of the ABA method. This allocation is kept to a lower percentage of the total due to the fairly wide variation about a mean bandwidth usage that camera video streams experience under varying usage conditions (such as high motion, low motion, high frequency back ground, low frequency background, etc.).

Each time the user "adds a camera" at his workstation, the ABA algorithm looks at the current set of all cameras and determines what each of the set should use for a "target bandwidth" for that camera's live stream. All cameras are by default "under ABA control." However, the present embodiment allows the user to shift cameras into and out of the ABA control state. All such cameras receive an approximately equal share of the available bandwidth after subtracting the bandwidth that has been allocated to cameras that are "not under ABA" control.

The Group Component and Player Component advanced options associated with the camera have a user interaction element that is a slider labeled "Quality vs. Speed." In the present embodiment this slider reflects the frame rate of the camera and is set to the ABA default based on a multi-dimension array that takes into account the measurement of available bandwidth and the resolution that will be captured from the camera (i.e., 160 pixels width and 120 pixels height).

Based on the available bandwidth, the number of cameras being used, and the resolution of each camera, the ABA default array yields a frame rate and target bandwidth usage for this camera. This target bandwidth is reflected by the position of the "Quality vs. Speed" slider. If the user does not move this slider, the camera is deemed "under ABA control" and its usage will be dynamically adjusted as more cameras are added or removed from usage at the client. If the user moves the slider up or down, the ABA method (as it applies to the specific camera associated with the slider) is turned off and the users assignment via the slider causes a fixed assignment of bandwidth usage (up or down from the default). All of the remaining ABA controlled cameras automatically adjust using the new aggregate bandwidth target that is now, for example, 40% of the measured bandwidth minus the total bandwidth allocated to all "not under ABA" control.

In another embodiment of the ABA algorithm, the slider adjustment does not remove the camera from ABA control. In this case, the user's slider interaction is used to alter the percentage allocation that the camera receives while under ABA control. Rather than a strictly fair allocation, this camera receive a higher or lower percentage of fair allocation depending on which direction the user moves the slider and by what percentage of full range it is moved.

Figure 3:
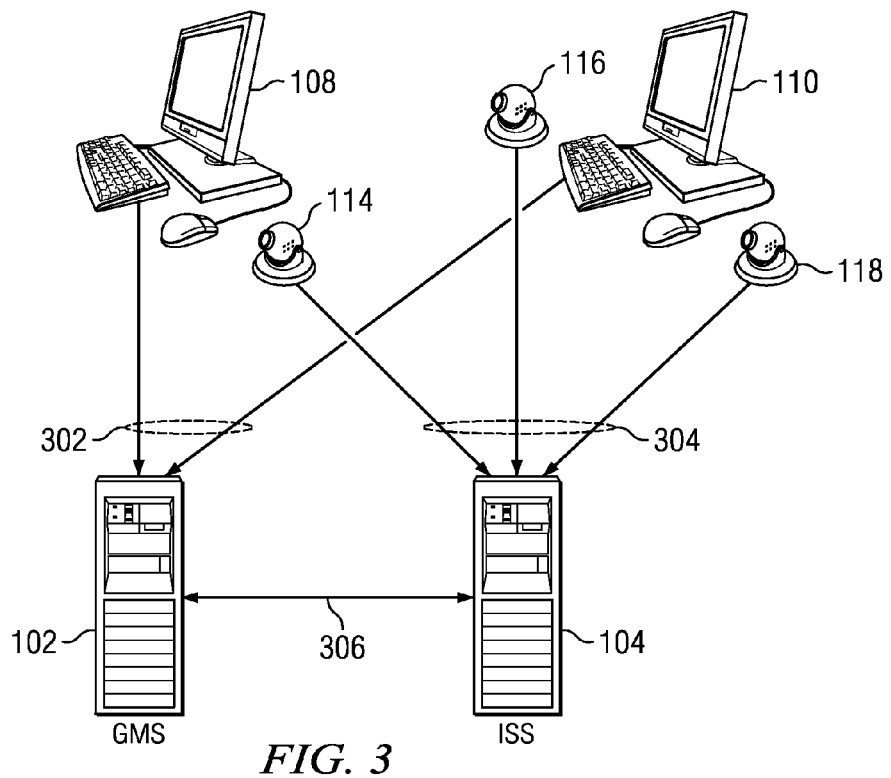
FIG. 3 is a more detailed depiction of the data traffic in an embodiment of the system of the present invention.

FIG. 3 is a more detailed depiction of the data traffic in an embodiment of the system of the present invention. As shown, the GMS (102) and ISS (104) communicate with each other over the network (306). This network (306) may be dedicated for security or bandwidth reasons, or may be shared with the clients. Each client (108 and 110) communicates directly with the GMS (102) over a connection (302), while the cameras provide video feed to the ISS (104) over another connection (304). The first client (108) has only one camera (114) while the second client (110) has two cameras (116 and 118), each with a connection to the ISS (304). In the present embodiment the connections are established as dedicated sockets that communicate over a common TCIP network. However, in another embodiment the communication paths are isolated to improve bandwidth availability for video feeds.

Figure 4:
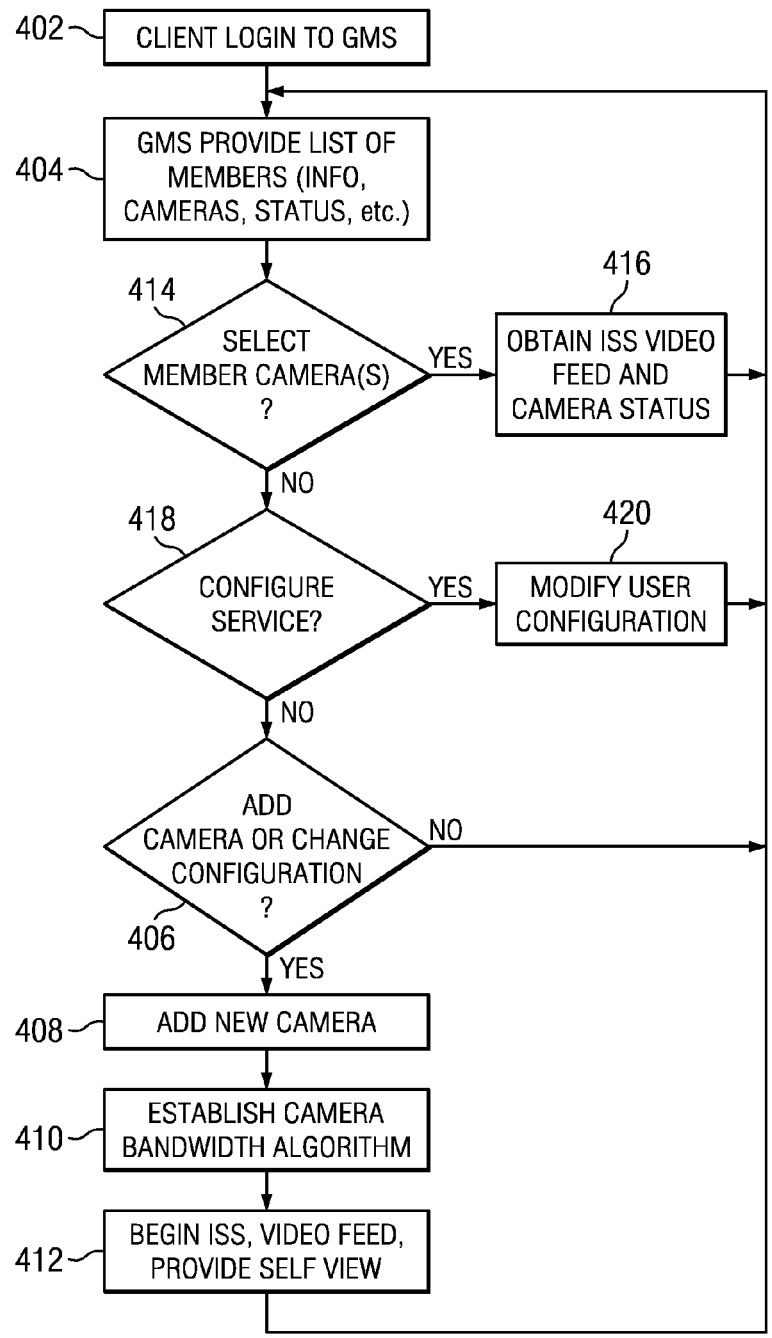
FIG. 4 is a flowchart depicting a portion of the functionality of the embodiment with regard to a client system and operation of the graphical user interface.

FIG. 4 is a flowchart depicting a portion of the functionality of the embodiment with regard to a client system and operation of the graphical user interface. As shown, the user logs into the GMS (402) as previously mentioned. Upon login, the GMS populates the client browser interface with a list of members (i.e., member information, cameras available, status of members/cameras, etc.) (404). The user may then select to select members to join with (414), configure his service (418), or add or change camera configuration (406). If the user selects one or more of a member's cameras (414), the ISS video feed is supplied to the client browser along with the camera status (416). If the user chooses to configure the service (418), appropriate dialog boxes are provided to modify the user configuration as previously discussed (420). If the user adds or changes a camera configuration (406), the camera is added to the saved configuration (408), the bandwidth algorithm is considered (410), and the client begins feeding video to the ISS (412), along with the SelfView in the client browser.

Figure 5:
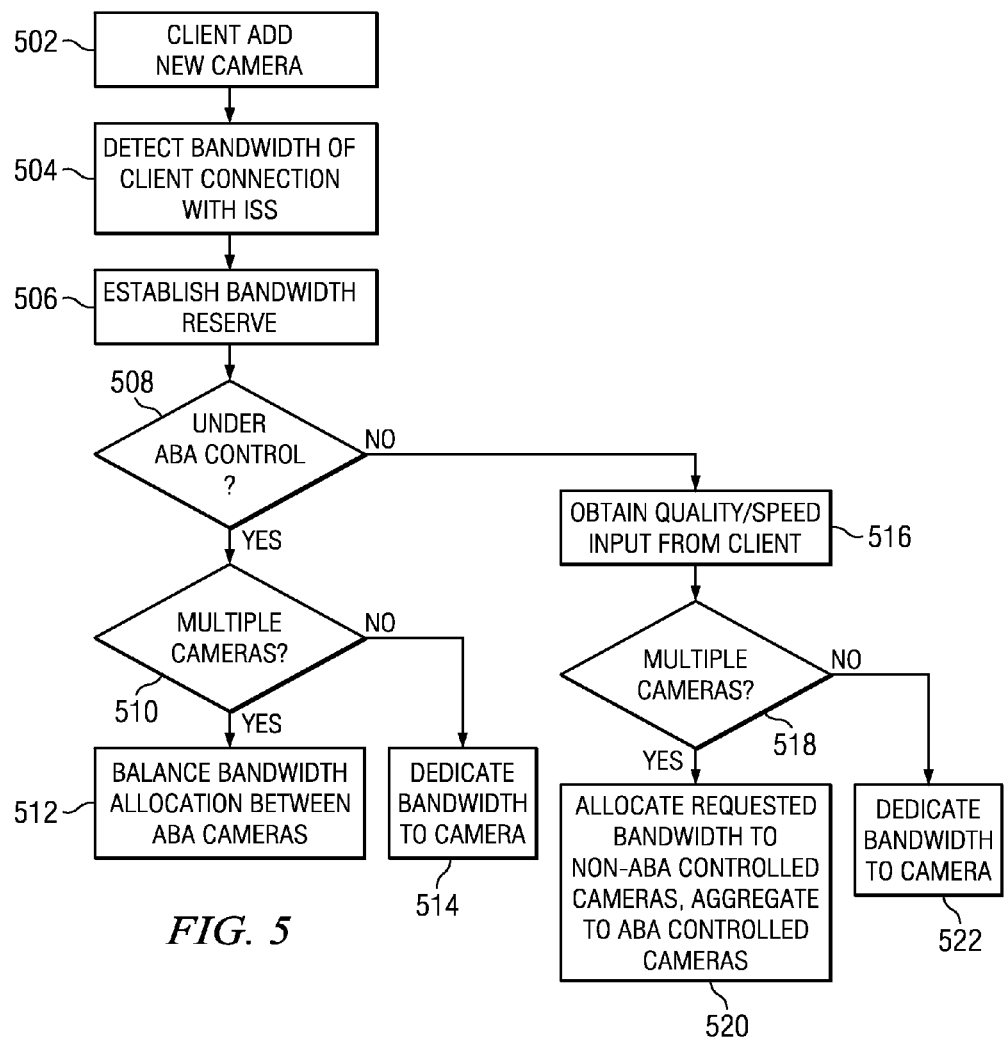
FIG. 5 is a flowchart depicting operation of an embodiment of the bandwidth algorithm.

FIG. 5 is a flowchart depicting operation of an embodiment of the bandwidth algorithm. As shown, when a new camera is added (502), the ISS samples the bandwidth of the client connection (504). A bandwidth reserve is then established (506) so as to provide sufficient bandwidth margin. If the camera is under ABA control (508), and there is only one camera (510), the allocated bandwidth is dedicated to this camera (514). If, however, there are multiple cameras (510), the bandwidth is allocated between the ABA cameras. If the new camera is not under ABA control (508), the system obtains the desired Quality/Speed setting from the client (516). If multiple cameras are in the system (518), the ISS allocates the requested bandwidth to the new and other non-ABA controlled cameras (per each camera's setting) and provides the remaining aggregate to any ABA controlled cameras (520). If there is only a single camera (518), the bandwidth is allocated to this camera (522).

The invention may be embodied in other specific forms without departing from the spirit or essential characteristics thereof. The present embodiments are therefore to be considered in all respects as illustrative and not restrictive. Accordingly, the scope of the invention is established by the appended claims rather than by the foregoing description. All changes which come within the meaning and range of equivalency of the claims are therefore intended to be embraced therein. Further, the recitation of method steps does not denote a particular sequence for execution of the steps. Such method steps may therefore be performed in a sequence other than that recited unless the particular claim expressly states otherwise.

We claim:

1. A group collaboration system comprising:
   (a) a first computing device, said first computing device capable of accepting network connections from a plurality of client systems, each client system having one or more associated video cameras, said first computing device capable of generating a user interface on each client system, said user interface including a first display section that includes a list of available other-client system video cameras and a second display section that includes a video display from each other-client system video camera; and
   (b) a second computing device in network communication with said first computing device, said second computing device capable of receiving a video stream from each of said plurality of client system video cameras and further capable of streaming said received video streams to said connected client system user interface second display sections;
   wherein
   said second computing device is capable of allocating bandwidth between multiple cameras associated with a single client system, said single client system capable of designating each associated cameras under manual or automatic bandwidth control, said manual bandwidth control requiring user specification of bandwidth allocation for cameras under manual control, said bandwidth allocation processing steps comprising:
   (1) detecting the bandwidth of the client connection with said second computing device;
   (2) allocating a first portion of the available bandwidth as a bandwidth reserve and a second portion of said available bandwidth for video streaming;
   (3) if multiple cameras are attached to said client system, allocating, from said second portion of said available bandwidth, the desired bandwidth to all manual controlled cameras such that the desired bandwidth is shared among said cameras, and the remaining bandwidth to the automatic controlled cameras such that the remaining bandwidth is shared among said cameras; and
   (4) if a single camera is attached to said client system, allocating the second portion of said available bandwidth to said single camera.

2. The group collaboration system of claim 1, wherein said first and second computing devices are operable from a single server hardware unit.

3. The group collaboration system of claim 1, wherein said second display section includes a self view video display of one or more video cameras associated with said client system upon which said user interface is visible.

4. The group collaboration system of claim 1, said user interface further including a third display section that includes a Message Component for transmission of text messages between connected users.

5. The group collaboration system of claim 1, wherein said second display section includes a recorded view video display of a recorded video stream from an other-client system video camera.

6. The group collaboration system of claim 1, wherein said second computing device is capable of recording individual video or text data streams for subsequent playback.

7. The group collaboration system of claim 1, wherein said second computing device is capable of synchronous recording and playback of a plurality of video or text data streams.

8. The group collaboration system of claim 1, wherein said second computing device is further capable of accepting an audio stream from a client system and further capable of streaming said received audio stream to said connected other-client computers for playback.

9. The group collaboration system of claim 8, wherein said second computing device is capable of synchronous recording and playback of a plurality of audio data streams.

10. The group collaboration system of claim 1, wherein said processing steps further comprise:
    allocating bandwidth between said first and said second portions of said available bandwidth based upon actual bandwidth usage of the associate cameras.

11. The group collaboration system of claim 1, wherein said processing steps further comprise:
    allocating bandwidth between two or more automatically controlled cameras based upon the user's input.

12. The group collaboration system of claim 1, wherein said processing steps further comprise:
    monitoring for user changes to said desired bandwidth for a manually controlled camera.

* * * * *